Feb. 6, 1934.   E. R. SHAFFER   1,945,921
TRAILER COUPLING
Filed Feb. 17, 1932   2 Sheets-Sheet 1
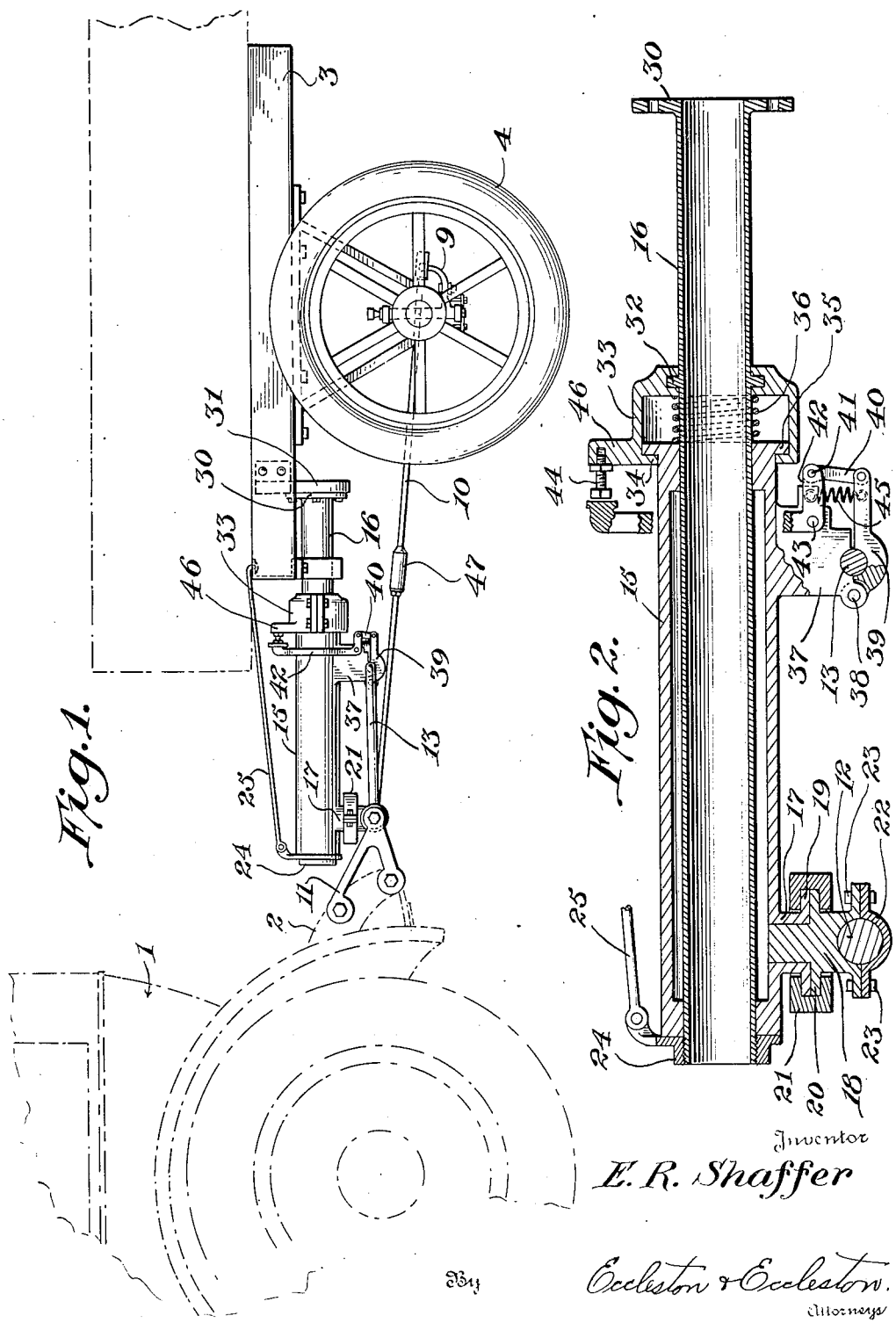
Inventor
*E. R. Shaffer*
By *Eccleston & Eccleston.*
Attorneys Feb. 6, 1934.  E. R. SHAFFER  1,945,921
TRAILER COUPLING
Filed Feb. 17, 1932   2 Sheets-Sheet 2
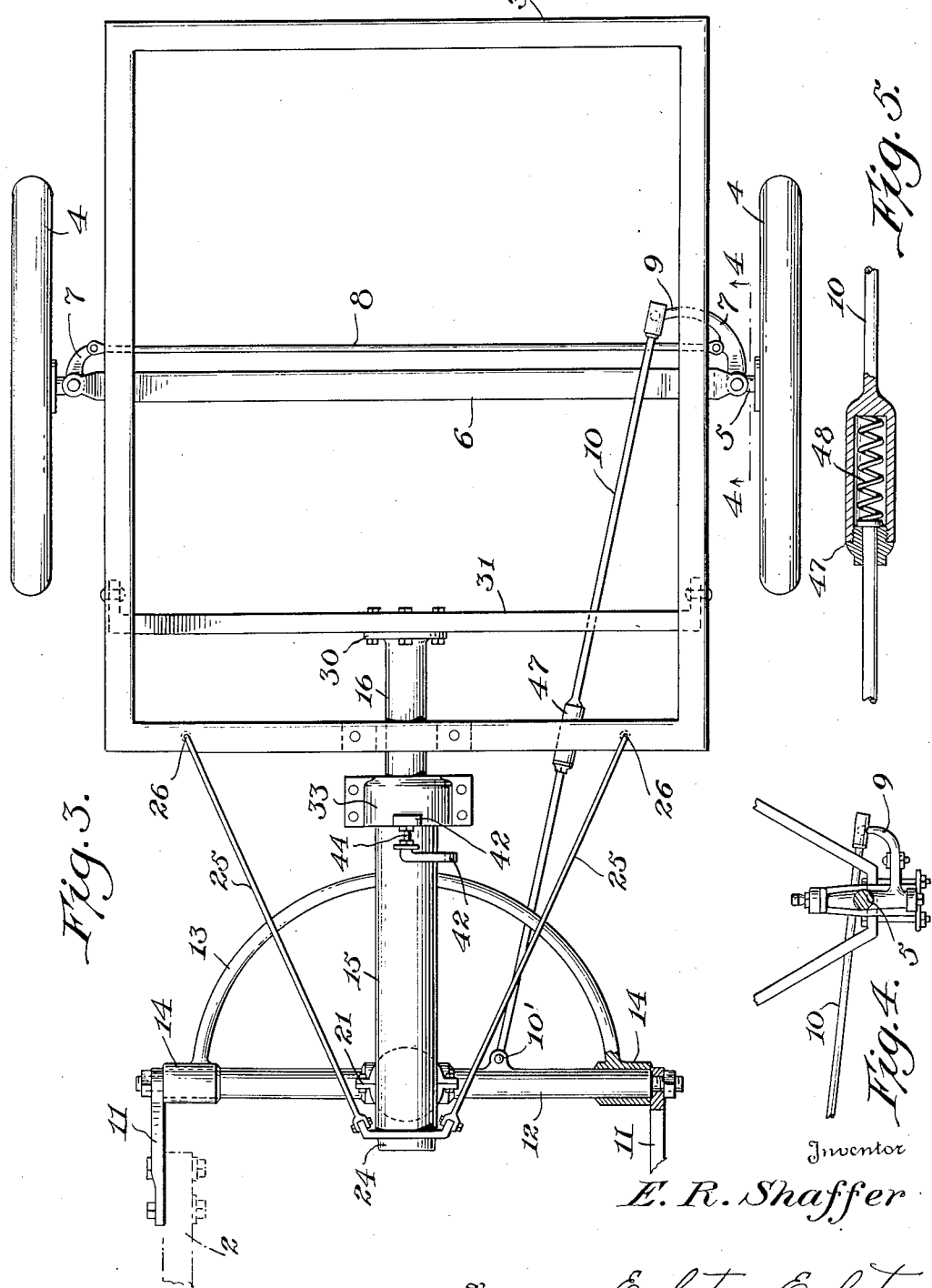
Inventor
E. R. Shaffer
By Eccleston & Eccleston,
Attorneys Patented Feb. 6, 1934

1,945,921

UNITED STATES PATENT OFFICE 1,945,921

TRAILER COUPLING

Elgie R. Shaffer, Columbus, Ohio

Application February 17, 1932. Serial No. 593,623

5 Claims. (Cl. 280—33.5)

The present invention relates to trailer couplings and more especially to that type of coupling for use with luggage cars or trailers adapted to be drawn by automobiles.

One of the primary objects of the invention is to provide a connection with the coupling by means of which the trailer will be automatically steered so as to follow directly behind the leading vehicle.

Another object of the invention resides in the provision of means for locking the trailer against lateral movement when descending a grade or when, for any reason, the trailer is pushing against the leading vehicle, as when the latter is stopping or backing.

A further object of the invention is to generally simplify and improve the construction of automobile trailer couplings.

Other objects and advantages of the invention will be apparent from the following description when taken in connection with the accompanying drawings in which, Figure 1 is a side elevational view of the coupling installed on a trailer, and showing in dotted outline a portion of the leading vehicle.

Figure 2 is a vertical longitudinal section through the coupling.

Figure 3 is a plan view of the construction shown in Figure 1.

Figure 4 is a sectional view taken on line 4—4 of Figure 3; and,

Figure 5 is a sectional view of a portion of the steering rod for the trailer.

More specifically the numeral 1 indicates a leading automobile, truck or the like provided with the usual frame 2 and numeral 3 indicates the body of a trailer suitable for carrying camping outfits or the like.

The wheels 4 of the trailer are mounted on stub axles 5 which are in turn supported on a main axle 6. The stub axles 5 are provided with steering knuckles 7 arranged to be operated in unison by the usual connecting rod 8. One of these steering knuckles is provided with an extension 9 to which is pivotally connected a steering rod 10 to be later described.

Mounted on the rear ends of the frame 2 of the leading vehicle are brackets 11 to which are rigidly secured a cross bar 12. Oscillatably mounted on the cross bar 12 is an arc-shaped rod 13 provided with sleeves 14 which encircle the ends of the bar 12.

Also oscillatably mounted on the bar 12 is a draft appliance composed essentially of the two elements or sleeves 15 and 16. The sleeve 15 is provided with a hollow neck portion 17 on its underside adjacent its forward end and mounted in this neck portion is a bearing member 18. The neck portion 17 is provided with a flange 19 and the bearing member 18 is provided with a similar flange 20. And a two part clamp 21 encircles these flanges so as to clamp the bearing member to the sleeve 15. The bearing member is provided in its lower end with a semi-circular cut out portion adapted to rest upon the top of the cross bar 12 and the semi-circular bearing member 22 which is bolted to the bearing member 18 as by means of bolts 23 serves to oscillatably secure the draft appliance to the bar 12. It will also be noted that by reason of the particular mounting of the bearing member 18 with respect to the sleeve 15 the coupling or draft appliance is adapted to swing in a horizontal plane.

Slidably mounted within the sleeve 15 is the tube 16, heretofore referred to, and the forward end of this sleeve is threaded to receive a ring 24. This ring 24 serves not only as a stop to limit the relative movement between the sleeves 15 and 16 in one direction but also as an anchoring means for brace rods 25 which are pivoted to the ring and which have their opposite ends anchored to the body of the trailer as indicated by numeral 26.

The opposite end of the tube 16 is provided with a flange 30 which is bolted to a cross brace rod 31 mounted adjacent the forward end of the trailer body. This sleeve 16 is also formed with an annular flange 32 spaced from its rear end and seated in an annular groove of a two part coupling member 33. The coupling member 33 is provided with an inwardly directed flange 34 which cooperates with an outwardly directed flange 35 formed on the rear end of the sleeve 15 and a spring 36 surrounding the sleeve 16 serves to normally hold the flange 34 against the flange 35 and the ring 24 on the forward end of the sleeve 16 against the forward end of the sleeve 15. It is thus apparent that a lost motion connection is provided between the elements 15 and 16 of the draft appliance. The relative movement between the two members of the draft appliance provided by this lost motion serves to operate a clamping mechanism to prevent lateral swaying of the trailer as will now be described.

At the rear end of the sleeve 15 is a downwardly extending projection 37 provided with a semi-circular cut out portion adapted to seat on the arc-shaped rod 13 and pivoted to the lower end of this projection as indicated at 38 is a clamping arm 39 which is also provided with a semi-circular portion to engage the lower face of the rod 13 when the clamp is moved to clamping position. To the free end of the clamp 39 is pivoted a link 40 which is in turn pivoted at 41 to a bell-crank lever 42. The lever 42 is pivoted to the extension 37 as indicated by the numeral 43 and extends upwardly to a point above the upper surface of the sleeve 15. The upper end of the lever 42 is normally held adjacent the head of a screw 44 by means of a tension spring 45 which has its respective ends connected with the clamp and the shorter arm with the bell-crank 42. The screw 42 is adjustably mounted in an extension 46 formed on the upper edge of the coupling member 33.

Normally the spring 45 will cause only a slight pressure of the clamping bar on the rod 13 but it will be apparent that if the upper arm of the bell-crank lever 42 is pushed forwardly by pressure of the trailer on the rear end of the sleeve 16 a very considerable clamping action on the rod 13 will be caused and will thus prevent the draft appliance 15—16 and also the trailer coupling from swinging about the bearing member 18 as a pivot.

By reason of the limited relative movement between the elements 15 and 16 which permits a relative movement between the leading vehicle and the trailer it is necessary that some lost motion connection be provided in the steering rod 10, and to this end the rod is provided with a sliding joint 47 in which is mounted a spring 48 which normally holds the rod in extended position but permits it to telescope slightly when the trailer moves toward the leading vehicle. The forward end of this rod 10 is pivotally connected to the cross bar 12 as indicated at 10'.

In the operation of the device the coupling as above described will automatically permit the trailer to swing about the pivotal connection to the bar 12 in both horizontal and vertical planes and the steering rod 10 through its connections will operate the stub shafts carrying the wheels 4 so as to properly steer the trailer. In order to prevent undue swaying of the trailer which often causes serious accidents on the highways, the clamp member 39 lightly grips the arc-shaped rod 13 by reason of the pressure imparted thereto by the spring 45. If the brake is applied to the leading vehicle as when descending a hill or for any other reason, or if the leading vehicle is backing, lateral movement of the trailer is absolutely prevented by reason of the relative movement between the elements 15 and 16 for the reason that this relative movement will swing the bell-crank lever about its pivot point 43 so as to apply sufficient gripping action to the rod 13 to prevent any movement of the coupling with respect thereto.

From the foregoing description taken in connection with the accompanying drawings it will be observed that I have provided a relatively simple and inexpensive construction of trailer coupling; that the coupling is so designed as to permit the necessary freedom of action of the trailer under ordinary circumstances; that it automatically alters the plane of rotation of the wheels of the trailer so as to cause the latter to properly follow the path of the leading vehicle; and that the draft appliance is so constructed as to prevent any lateral movement of the trailer when the latter tends to overrun the leading vehicle.

In accordance with the patent statutes I have described the preferred embodiment of the invention but various minor changes may be made therein without departing from the spirit of the invention. It is intended that such changes be included with the scope of the appended claims.

What I claim is:

1. In a device of the class described, a coupling member including an arc-shaped rod adapted to be pivoted to a leading vehicle, a draft appliance adapted to be pivotally connected to the leading vehicle and having engagement with said arc-shaped rod, and means for causing a frictional gripping action on said rod upon the application of certain forces to said draft appliance.

2. In a device of the class described, a coupling member including an arc-shaped rod and a draft appliance adapted to be connected to a leading vehicle, said draft appliance including relatively movable elements, means on one of said elements adapted to frictionally grip said arc-shaped rod, and means on the other element for operating said gripping means.

3. In a device of the class described, a coupling member including an arc-shaped rod and a draft appliance adapted to be connected to a leading vehicle, said draft appliance including relatively movable elements, a clamp pivoted to one of said elements and adapted to frictionally engage said arc-shaped rod, and adjustable means on the other element for operating said clamp.

4. In a device of the class described, a coupling member including an arc-shaped rod and a draft appliance adapted to be connected to a leading vehicle, said draft appliance including relatively movable elements, a clamp pivoted to one of said elements and adapted to frictionally engage said arc-shaped rod, a spring connected to said clamp for pressing it against said rod, a lever on one of said elements for augmenting the pressure of said spring, and means on the other element for operating said lever under certain conditions.

5. In a device of the class described, a coupling member including an arc-shaped rod and a draft appliance adapted to be connected to a leading vehicle, said draft appliance including relatively movable elements, a clamp pivoted to one of said elements and adapted to frictionally engage said arc-shaped rod, a spring connected to said clamp for pressing it against said rod, a lever on one of said elements for augmenting the pressure of said spring, and an adjustable pin on the other element for operating said lever under certain conditions.

ELGIE R. SHAFFER.